(12) United States Patent
McVey et al.

(10) Patent No.: US 9,147,283 B1
(45) Date of Patent: Sep. 29, 2015

(54) WATER SURFACE VISUALIZATION DURING A SIMULATION

(71) Applicant: Lockheed Martin Corporation, Bethesda, MD (US)

(72) Inventors: Sean R. McVey, Orlando, FL (US); Howell B. Hollis, Orlando, FL (US)

(73) Assignee: Lockhead Martin Corporation, Bethesda, MD (US)

( * ) Notice: Subject to any disclaimer, the term of this patent is extended or adjusted under 35 U.S.C. 154(b) by 226 days.

(21) Appl. No.: 13/663,619

(22) Filed: Oct. 30, 2012

Related U.S. Application Data

(60) Provisional application No. 61/553,204, filed on Oct. 30, 2011.

(51) Int. Cl.
*G06T 17/00* (2006.01)

(52) U.S. Cl.
CPC ............ *G06T 17/00* (2013.01); *G06T 17/005* (2013.01)

(58) Field of Classification Search
CPC ........ G06T 13/60; G06T 17/05; G06T 15/506
USPC .................................................. 345/419–427
See application file for complete search history.

(56) References Cited

U.S. PATENT DOCUMENTS

| | | | |
|---|---|---|---|
| 6,707,458 B1 | 3/2004 | Leather et al. | |
| 6,879,324 B1 | 4/2005 | Hoppe | |
| 6,995,761 B1 | 2/2006 | Schroeder et al. | |
| 7,280,109 B2 | 10/2007 | Hoppe | |
| 7,539,606 B2 | 5/2009 | Comair et al. | |
| 7,872,647 B2 | 1/2011 | Mayer et al. | |
| 7,948,485 B1* | 5/2011 | Larsen et al. | 345/420 |
| 7,983,474 B2 | 7/2011 | Van Workum et al. | |
| 8,638,330 B1* | 1/2014 | Praun et al. | 345/423 |
| 2001/0035867 A1* | 11/2001 | Murayama et al. | 345/585 |
| 2002/0101419 A1 | 8/2002 | Cook | |
| 2002/0118190 A1 | 8/2002 | Greasley | |
| 2003/0038816 A1* | 2/2003 | Ohta | 345/589 |
| 2003/0085895 A1* | 5/2003 | Oka | 345/426 |
| 2003/0090484 A1* | 5/2003 | Comair et al. | 345/420 |
| 2003/0112235 A1* | 6/2003 | Grace | 345/419 |
| 2003/0125111 A1* | 7/2003 | Oka | 463/31 |
| 2004/0181382 A1* | 9/2004 | Hu et al. | 703/9 |
| 2006/0018566 A1 | 1/2006 | Coleman et al. | |
| 2006/0170693 A1 | 8/2006 | Bethune et al. | |
| 2006/0176303 A1 | 8/2006 | Fairclough | |

(Continued)

OTHER PUBLICATIONS

Non-Final Office Action for U.S. Appl. No. 13/611,014, mailed Sep. 22, 2014, 23 pages.

(Continued)

*Primary Examiner* — Kee M Tung
*Assistant Examiner* — Ryan M Gray
(74) *Attorney, Agent, or Firm* — Withrow & Terranova, PLLC

(57) ABSTRACT

Water surface visualization during a simulation is disclosed. Elevation data that identifies an elevation of a water surface is accessed. Based on the elevation data, it is determined that a camera view location of a camera view is on a first side of a water surface. Object data is accessed that identifies a location comprising an elevation of each of a plurality of objects in the scene. An organization of a plurality of objects for rendering is determined based on the elevation of each object of the plurality of objects relative to the water surface. The water surface scene portion is rendered based on the organization.

20 Claims, 10 Drawing Sheets

(56) References Cited

U.S. PATENT DOCUMENTS

| | | | |
|---|---|---|---|
| 2007/0038421 A1* | 2/2007 | Hu et al. | 703/6 |
| 2007/0257903 A1* | 11/2007 | Gutierrez et al. | 345/419 |
| 2008/0143713 A1* | 6/2008 | Chiu et al. | 345/420 |
| 2008/0208468 A1 | 8/2008 | Martin | |
| 2009/0089018 A1 | 4/2009 | Kelley et al. | |
| 2010/0238161 A1* | 9/2010 | Varga et al. | 345/419 |
| 2011/0055746 A1* | 3/2011 | Mantovani et al. | 715/771 |
| 2011/0295575 A1 | 12/2011 | Levine et al. | |

OTHER PUBLICATIONS

Non-Final Office Action for U.S. Appl. No. 13/611,199, mailed Sep. 5, 2014, 17 pages.

"Boston, Massachusetts Region, Digital Elevation Model with Bathymetry," Harvard Map Collection, Harvard College Library, 2009, 4 pages.

"Digital elevation model," Wikipedia, published as early as Feb. 18, 2012, 6 pages.

"Microsoft ESP SDK: Enabling customized and immersive simulation experiences," White Paper, Nov. 2007, 11 pages.

Bruneton, E. et al., "Real-time rendering and editing of vector-based terrains," Eurographics, vol. 27, No. 2, 2008, pp. 311-320.

Pajarola, R., "Large scale terrain visualization using the restricted quadtree triangulation," Proceedings Visualization, vol. 98, Oct. 1998, pp. 19-26.

Szofran, A. et al., "Microsoft ESP: Global terrain technology for Microsoft ESP," Jan. 2008, 22 pages.

Tsai, F. et al., "Adaptive level of detail for large terrain visualization," The International Archives of the Photogrammetry, Remote Sensing and Spatial Information Sciences, vol. XXXVII, Part B4, Beijing, 2008, pp. 579-584.

Pajarola, R., "Overview of Quadtree-based Terrain Triangulation and Visualization," UCI-ICS Technical Report No. 02-01, Department of Information & Computer Science, University of California, Irvine, Jan. 2002, 16 pages.

Notice of Allowance for U.S. Appl. No. 13/611,014, mailed Mar. 17, 2015, 13 pages.

Notice of Allowance for U.S. Appl. No. 13/611,199, mailed Mar. 11, 2015, 14 pages.

* cited by examiner

WATER SURFACE VISUALIZATION DURING A SIMULATION

RELATED APPLICATIONS

This application claims the benefit of "RUNTIME VISUALIZATION OF SURFACE AND SUBSURFACE ENVIRONMENTS WITH TRANSLUCENT WATER," provisional patent application Ser. No. 61/553,204, filed on Oct. 30, 2011, and is related to "MULTI-LAYER DIGITAL ELEVATION MODEL," patent application Ser. No. 13/611,199, filed on Sep. 12, 2012 and "CONCURRENT MESH GENERATION IN A COMPUTER SIMULATION," patent application Ser. No. 13/611,014, filed on Sep. 12, 2012, the contents of each of which are hereby incorporated herein by reference in their entirety.

TECHNICAL FIELD

The embodiments relate to visualizations of a virtual environment during a simulation, and in particular to visualizations of water surfaces during a simulation.

BACKGROUND

Virtual environments may include water surfaces, such as oceans, lakes, rivers, and the like, that must be visualized at various times during a simulation. A visualization typically involves rendering a scene in the virtual environment and presenting the rendered scene to a simulation user. Realistically visualizing a water surface presents certain challenges, since water reflects the images of objects above the water surface, and refracts the images of objects below the water surface. Moreover, in a real world environment, which objects below the water surface can be seen from above the water surface may depend on myriad factors, such as the size of the object, the depth of the object, the clarity of the water, the angle of the view with respect to the water surface, and the like. Realistic below-water visualizations of a water surface involve many of the same factors, in particular, reflection of underwater objects off the water surface, and refraction of objects above the water surface. Simulations often deal with these difficulties by simply ignoring reflections and refractions, resulting in an unrealistic water visualization.

In order to efficiently and realistically visualize a water surface such that the reflective and refractive properties of water are realistically depicted, it may be necessary for a simulator to relatively quickly ascertain the elevation of objects with respect to the elevation of the water surface. This becomes increasingly difficult to do as the area of the virtual environment increases, such as a full-earth simulation, since there are large numbers of bodies of water at different elevations, as well as many objects near, above, and below such bodies of water whose locations and elevations must also be quickly ascertainable in order to realistically visualize a particular region of the earth.

SUMMARY

Embodiments disclosed herein relate to the visualization of water surfaces in a virtual environment. In one embodiment, a water surface scene portion of a scene in a virtual environment which may be rendered. Elevation data may be accessed. The elevation data may identify an elevation of a water surface. Based on the elevation data, it may be determined that a camera view location of a camera view is on a first side of the water surface. Object data may be accessed that identifies a location comprising an elevation of each of a plurality of objects in the scene. An organization of a plurality of objects for rendering may be determined based on the elevation of each object of the plurality of objects relative to the water surface. The water surface scene portion may be rendered based on the organization. In one embodiment, the organization of the plurality of objects may be determined for rendering by determining, for each object of the plurality of objects, at least one sub-scene in which the object is to be rendered.

In one embodiment, multiple sub-scenes may be rendered and then combined to form the water surface scene portion. In particular, a reflection sub-scene may be generated that includes objects of the plurality of objects that are on the first side of the water surface. A refraction sub-scene may also be generated that includes objects of the plurality of objects that are on a second side of the water surface. The reflection sub-scene and the refraction sub-scene may be combined to generate the water surface scene portion.

In one embodiment, the reflection sub-scene may be generated, at least in part, through the use of a mirrored camera view. In particular, a mirrored camera view on the second side of the water surface may be determined based on a camera view. The mirrored camera view may include a mirrored camera view location and a mirrored camera view direction. A first subset of the plurality of objects that are within the mirrored camera view, based on the elevation data, on the first side of the water surface may be determined. The reflection sub-scene that includes the first subset of objects of the plurality of objects that are on the first side of the water surface may be generated.

The object data may include a corresponding longitude, latitude, and elevation for each object of the plurality of objects, and the elevation data may include a longitude, latitude, and elevation at each location of a plurality of locations of the water surface. The organization of the objects for rendering may include determining, for each object, a corresponding longitude, latitude, and elevation of the object, accessing the elevation data, determining an elevation of the water surface at the longitude and latitude, and determining which sub-scene of a plurality of sub-scenes into which the object is to be rendered based on a difference between the elevation of the object and the elevation of the water surface at the corresponding longitude and latitude.

In some embodiments, the object data may include 64-bit longitude, latitude, and elevation values for each object. After determining the organization of the objects for rendering, and prior to rendering, location information for each object may be translated from the corresponding 64-bit longitude, latitude, and elevation values to a 32-bit x, y, and z coordinate of a local coordinate system.

Those skilled in the art will appreciate the scope of the embodiments and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the embodiments, and together with the description serve to explain the principles of the embodiments.

DETAILED DESCRIPTION

Figure 1:
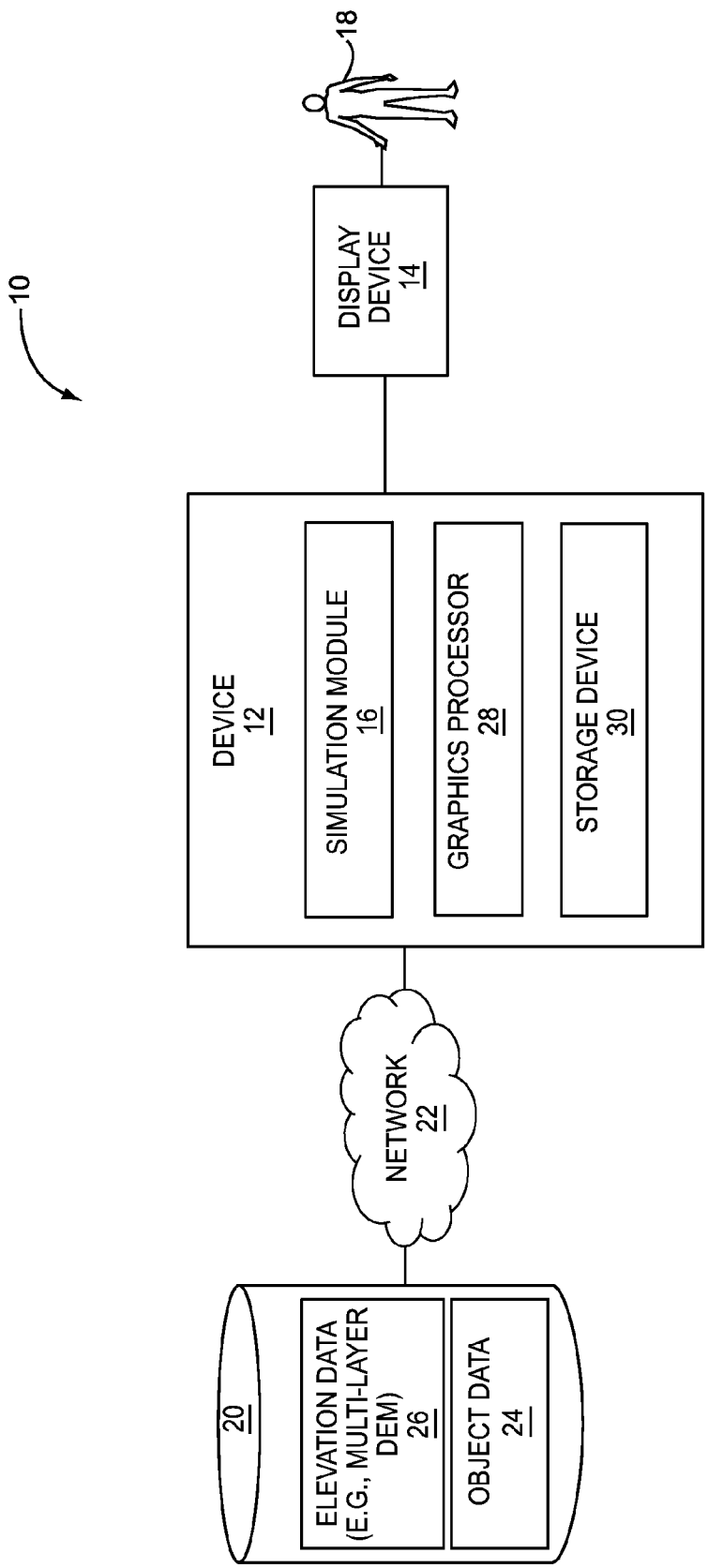
FIG. 1 is a block diagram of a system according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the embodiments and will recognize applications of these concepts not particularly addressed herein. It should be understood that these concepts and applications fall within the scope of the embodiments and the accompanying claims.

A large scale simulation, such as, by way of non-limiting example, a full-earth simulation, presents certain challenges that may not be present in a smaller scale simulation involving a virtual environment of relatively small, finite dimensions. In the latter, the locations and elevations of terrain and objects in the virtual environment may all exist, or be relatively quickly converted to a coordinate system of the virtual environment that may be used by the graphics processing module to render scenes of the virtual environment to a user. Graphics processing modules typically operate using 32-bit units of information.

A large scale simulation may acquire information about the terrain and objects in the terrain from one or more sources that use real-world data, such as, by way of non-limiting example, actual longitude, latitude, and elevation (e.g., altitude) (hereinafter "LLA") information describing the terrain and objects, such as, by way of non-limiting example, buildings, trees, and the like, in the real world. Such information may typically be in a 64-bit format and therefore may not be processed directly by a graphics processing module. Accordingly, prior to rendering a scene, information regarding the positions of objects in a scene may be converted from the 64-bit LLA system to a 32-bit x,y,z coordinate system used by the graphics processing module. However, translating a large quantity of information from one coordinate system to another, only to then determine which objects in the virtual environment may or may not be part of a scene in a virtual environment, while concurrently attempting to provide a high-fidelity, high-framerate simulation of the virtual environment, may not be practical, or even possible.

A full-earth simulation may involve many different water surfaces, such as, by way of non-limiting example, oceans, lakes, ponds, rivers, and the like. Such simulations may include visualization of the Earth from varying points of view, including, but not limited to, subsurface, surface, air, and high-atmosphere environments. Realistic visualizations of a water surface pose challenges in order to realistically simulate the reflective and refractive properties of water. In some situations, even subsurface environments, such as the bed of a river, lake, or ocean, and/or objects resting on the bed, may be perceivable from above the water surface. Many simulations simply ignore reflection, refraction, and other subsurface issues, and the resultant water surfaces which are depicted during the simulation are relatively unrealistic.

On top of the challenges posed by large scale simulations and realistic visualization of water surfaces from above the water, it may be desirable to simulate views of water surfaces from below the water surface as well. This may arise, by way of non-limiting example, when a user/participant in a simulation may select different views in the simulation, such as one from an airplane, or one from a submarine. It may also arise when a user is able to transition between a location above the water surface to one below the water surface, such as a simulation involving the periscope of a submarine, or a simulation involving an amphibious vehicle.

Realistic visualizations of water surfaces from an underwater location pose the same reflective and refractive issues discussed above, and also involve simulating the translucent characteristics that are perceived by a human when under the water, or when viewing underwater objects from above the water. Thus, the embodiments may allow light, but not detailed images, to pass through the water surface.

Among other features, the embodiments disclosed herein provide solutions to many of the issues and problems associated with large scale simulations involving multiple water surfaces, and the realistic rendering of such water surfaces in a simulation. The embodiments may also permit panning from viewpoints of various altitudes, including altitudes above, at, and below sea level, while maintaining system performance and minimizing visual artifacts.

The embodiments may be used in any application wherein a visualization of a water surface is desired, including, by way of non-limiting example, mapping applications, gaming and entertainment applications, training and simulation applications, weather applications, and the like. The embodiments may also be incorporated into a simulation device, such as a flight simulator, a submarine simulator, a tank simulator, or an automobile or truck simulator.

FIG. 1 is a block diagram of a system 10 according to one embodiment. The system 10 may include a device 12 that is communicatively coupled to a display device 14. The display device 14 may be a separate device from the device 12, such as one or more monitors that are coupled to the device 12, or may be integrated with the device 12. The device 12 may include a simulation module 16 that may be configured to provide a simulation of a virtual environment to one or more users 18.

The device 12 may be coupled to a storage device 20 via a network 22. The storage device 20 may be used to store data that is used to visualize, or render, a scene of the virtual environment to the user 18. As used herein, the phrase "render" refers to a process for generating imagery, typically comprising pixels, that depicts a scene in the virtual environment. The imagery may then be displayed, by way of non-limiting example, to the user 18 on the display device 14. The embodiments herein relate primarily to a water surface scene portion of a scene. The water surface scene portion is a portion of the scene which includes the surface of the water, imagery of objects that may be reflected by the surface of the water, and imagery of objects that may be seen below the surface of the water.

The storage device 20 may be used to store object data 24, which may include one or more data structures that identify attributes of the virtual environment, such as, by way of non-limiting example, information regarding each object in the virtual environment, including the spatial relationships of objects in the virtual environment, locations of the objects in the virtual environment, attributes and characteristics of the objects in the virtual environment, graphical information, and the like. In one embodiment, locations of objects are maintained in a 64-bit longitude, latitude, elevation (e.g., altitude) (LLA) format. Thus, each object may have a corresponding longitude value that identifies a longitude of the object, a latitude value that identifies a latitude of the object, and an elevation value that identifies an elevation of the object. In the context of a full-earth simulation, such LLA information may be relatively accurate in representing actual LLA locations of objects in the real world. Using LLA values facilitates, in one embodiment, a large scale simulation, such a full-earth simulation, since in a realistic full-earth simulation objects may be located anywhere in the world. The object data 24 may be continually updated during the simulation and reflects a current status of the virtual environment. The object data 24 may also identify simulated objects that have no correspondence to a real world object, such as a ship, an airplane, or the like, that are generated to provide a realistic simulation to the user 18. Each such simulated object may also have a corresponding longitude value that identifies a longitude of the simulated object, a latitude value that identifies a latitude of the simulated object, and an elevation value that identifies an elevation of the simulated object.

The storage device 20 may also store elevation data 26 that stores elevation data of one or more surfaces in the virtual environment. The elevation data 26 may include, by way of non-limiting example, the LLA of a plurality of locations of the terrain in the virtual environment. The elevation data 26 may also include, by way of non-limiting example, the LLA of a plurality of locations of the water surfaces in the virtual environment. The elevation data 26 may also include, by way of non-limiting example, the LLA of a plurality of locations of bathymetric surfaces in the virtual environment. In the context of a full-earth simulation, such LLA information may be relatively accurate in representing actual LLA locations of the surfaces in the real world.

As will be discussed in greater detail with respect to FIG. 2, in one embodiment the elevation data 26 may comprise a multi-layer digital elevation model (DEM) structure that comprises elevation data associated with multiple elevation layers in the virtual environment.

The device 12 may include a graphics processor 28 used to render scenes in the virtual environment based on the elevation data 26 and the object data 24. The graphics processor 28 may operate in 32-bit units of information, and accordingly, 64-bit location information maintained in the elevation data 26 and the object data 24 may be converted, or otherwise translated, to 32-bit x,y,z local-world coordinates prior to processing by the graphics processor 28. In some embodiments, the elevation data 26, the object data 24, or both may be stored locally on a storage device 30. For purposes of illustration and brevity, any functionality implemented herein by an element of the device 12, such as the simulation module 16 or the graphics processor 28, may be described herein as being performed by the device 12.

Figure 2:
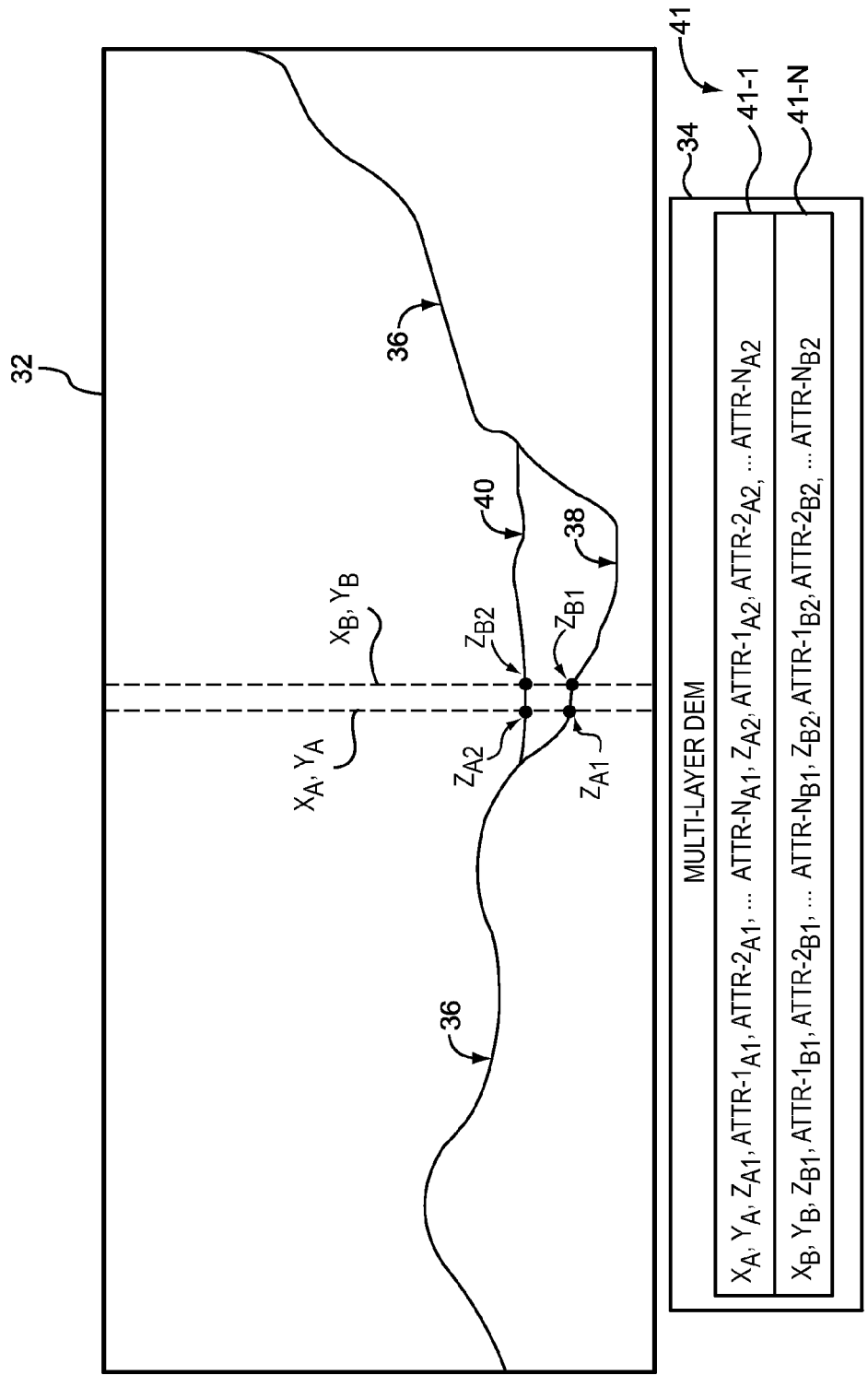
FIG. 2 is a diagram of an environment, and a multi-layer digital elevation model (DEM) structure suitable for practicing embodiments disclosed herein.

FIG. 2 is a diagram of an environment 32, and a multi-layer DEM structure 34 (hereinafter multi-layer DEM 34) suitable for practicing embodiments disclosed herein. As discussed in greater detail herein, the multi-layer DEM 34 may comprise elevation data associated with multiple elevation layers in the environment 32. The environment 32 may comprise a location on earth, by way of non-limiting example. The environment 32 may include various surface types, including a terrain surface type 36, a bathymetric surface type 38, a water surface type 40, and the like. In order for a simulator to visualize the environment 32, the simulator may access elevation data, such as the multi-layer DEM 34, associated with the environment 32; generate a mesh that approximates the elevation contour of the environment 32; render imagery associated with the various surfaces and objects in the environment 32; and map appropriate locations of the mesh to corresponding imagery, resulting in a rendered scene that closely resembles the environment 32.

The multi-layer DEM 34 may comprise a plurality of DEM entries 41-1-41-N (generally, DEM entries 41), each of which comprises location identifiers that identify a particular location in the environment 32. While for purposes of illustration only two DEM entries 41 are shown, the multi-layer DEM 34 may comprise thousands, or even millions, of DEM entries 41, depending, among other things, on the size of the environment 32 and the resolution at which location identifiers identify locations in the environment 32.

A location in the environment 32 may be identified in any suitable manner, including, by way of non-limiting example, via a latitude value and a longitude value. The DEM entry 41-1 comprises a location identifier that identifies a location at $X_A,Y_A$ in the environment 32, and the DEM entry 41-N comprises a location identifier that identifies a location at $X_B,Y_B$ in the environment 32. In this example, the X coordinate may comprise a particular latitude, and the Y coordinate may comprise a particular longitude. A location in the environment 32 may have one or more associated elevation layers. An elevation layer may be based on an elevation of a particular surface type, such as the elevation of the terrain surface type 36, the elevation of the bathymetric surface type 38, or the elevation of the water surface type 40, or may be based on any other desirable criteria, such as the elevation of an underground aquifer in the environment 32, or the elevation of the jet stream in the environment 32, by way of non-limiting example.

For each elevation layer in the environment 32, the multi-layer DEM 34 may identify an elevation value that corresponds to a particular location identifier. The elevation values may be with respect to a reference surface, such as a reference ellipsoid, or the like. Thus, at the location $X_A,Y_A$, the DEM entry 41-1 identifies an elevation value $Z_{A1}$ that identifies the elevation of a first elevation layer at the location $X_A,Y_A$ in the environment 32. Assume for purposes of illustration that the first elevation layer corresponds to the bathymetric surface type 38, and thus identifies an elevation of the bathymetric surfaces (i.e., underwater surfaces) in the environment 32. The DEM entry 41-N identifies an elevation value of $Z_{B1}$ for the first elevation layer at the location $X_B,Y_B$. A second elevation layer in the environment 32 may comprise the elevation of water surfaces. Accordingly, the DEM entry 41-1 identifies an elevation value of $Z_{A2}$ that identifies the elevation of the second elevation layer at the location $X_A,Y_A$ in the environment 32. The DEM entry 41-N identifies an elevation value of $Z_{B2}$ that identifies the elevation of the second elevation layer at the location $X_B,Y_B$ in the environment 32. Some elevation layers may exist only at certain locations in the environment 32. The use herein of ordinals in conjunction with an element is solely for distinguishing what might otherwise be similar or identical labels, such as "first elevation layer" and "second elevation layer," and does not imply a priority, a type, an importance, or other attribute, unless otherwise stated herein.

The multi-layer DEM 34 may also identify attribute data for each elevation layer. Attribute data may include information associated with the respective elevation layer at a particular location. Attribute data may comprise any desired information. Non-limiting examples of attribute data may comprise temperature, pressure, or surface type associated with the elevation layer. Different types of attribute data may be relevant to different elevation layers. By way of non-limiting example, for the second elevation layer of the environment 32, the attribute data may comprise sea state attribute data that identifies a sea state that represents water turbulence at a particular location, or clarity attribute data that identifies the water clarity at a particular location.

The DEM entry 41-1 identifies attribute data ATTR-$1_{A1}$, ATTR-$2_{A1}$, and ATTR-$N_{A1}$ as being associated with the first elevation layer at location $X_A, Y_A$, and attribute data ATTR-$1_{A2}$, ATTR-$2_{A2}$, and ATTR-$N_{A2}$ as being associated with the second elevation layer at location $X_A, Y_A$. The DEM entry 41-N identifies attribute data ATTR-$1_{B1}$, ATTR-$2_{B1}$, and ATTR-$N_{B1}$ as being associated with the first elevation layer at location $X_B, Y_B$, and attribute data ATTR-$1_{B2}$, ATTR-$2_{B2}$, and ATTR-$N_{B2}$ as being associated with the second elevation layer at location $X_B, Y_B$. The attribute data may be used by a simulator for a number of purposes, including, by way of non-limiting example, the imagery used to depict the elevation layer during the simulation.

While for purposes of illustration a multi-layer DEM 34 is discussed herein, the embodiments are not limited to the use of a multi-layer DEM 34. Any suitable structure or structures that contain information identifying multiple elevation layers in the environment 32 may be used. Preferably, if multiple structures are accessed, each of which may contain information about a separate elevation layer, such information may be synchronized, or registered, with one another so a simulator can quickly ascertain the elevation values of multiple elevation layers at a same location in the environment 32.

The use of the multi-layer DEM 34, however, may be preferable to the use of multiple single-layer DEM structures. The multi-layer DEM 34 consolidates a substantial amount of information regarding elevation layers, including elevation values and attribute data associated therewith, in a single data structure, reducing processing time and memory fetches of a simulator while generating meshes. A single DEM entry 41 may be used to generate meshes associated with multiple elevation layers, as well as to provide relevant attribute data that corresponds to each elevation layer. Accessing multiple structures to obtain such information may require substantial additional processing power, relatively slow storage operations, and additional memory fetches, which may result in the simulator generating a lower-resolution mesh in order to maintain a desired frame rate of a visualization.

The multi-layer DEM 34 may be generated prior to the initiation of the simulation, or may be generated, by way of non-limiting example, during an initialization phase of the simulation. The multi-layer DEM 34 may be generated in any suitable manner, and may involve accessing multiple different data sources, each of which identifies an elevation layer in the environment 32, and registering one such data source with another such data source to determine the elevation values of the corresponding elevation layers at desired locations in the environment 32. Additional data sources may be accessed to determine relevant attribute data. One mechanism for generating a multi-layer DEM 34 is disclosed in "MULTI-LAYER DIGITAL ELEVATION MODEL," referenced above. In one embodiment, the multi-layer DEM 34 may be generated during an initialization phase of the simulation at a desired level of detail based on data determined at run-time, such as user input, user viewpoint location, configuration parameters, or the like.

Figure 3:
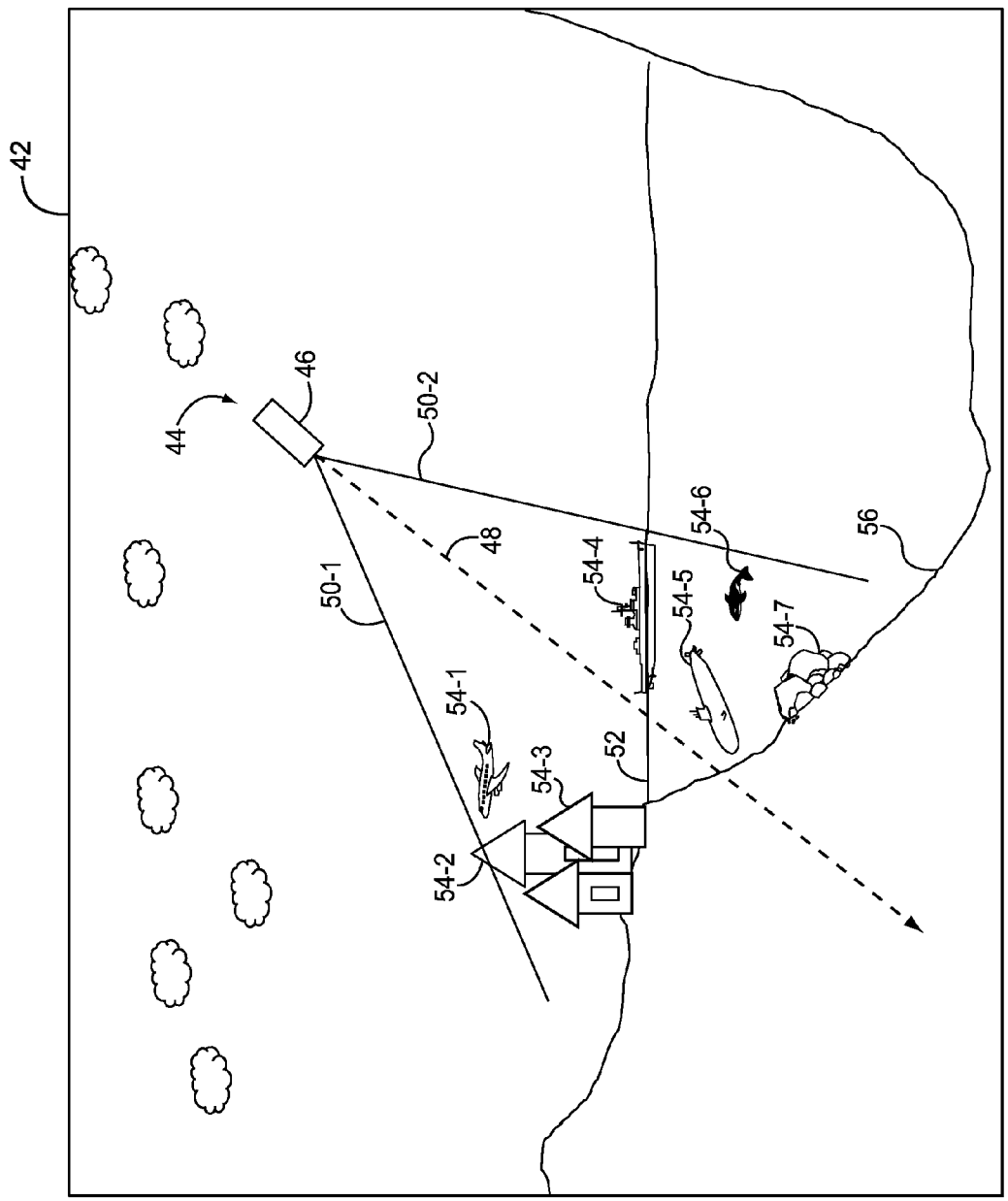
FIG. 3 is a diagram of a portion of a virtual environment according to one embodiment.

FIG. 3 is a diagram of a portion of a virtual environment 42 according to one embodiment, and will be discussed in conjunction with FIG. 1. The particular scene from the virtual environment 42 that will be rendered for the user 18 on the display device 14 is based on various attributes associated with a camera view 44. The camera view 44 may include attributes such as a camera view location 46 and a camera view direction 48. The camera view 44 may be associated, by way of non-limiting example, with an object in the virtual environment 42 operated by the user 18, such as an airplane (not illustrated). Thus, the camera view 44 may represent what the user 18 would see at the instant in time that the airplane is at the camera view location 46, and the user 18 is looking in the camera view direction 48. The camera view 44 may have other attributes that affect what would be perceived by the user 18, including, by way of non-limiting example, a horizontal and a vertical field of view (FOV). Assume that the lines 50-1 and 50-2 define that portion of the virtual environment 42 that would be perceivable by the user 18. While for purposes of illustration the location of the camera view 44 is discussed in conjunction with the user 18, in other embodiments, the camera view 44 may be altered, by way of non-limiting example, based on updates that are based on a global positioning system (GPS) tracking position, or may be altered based on pre-recorded camera paths, or via use of artificial intelligence algorithms, or the like.

According to one embodiment, the device 12 may render a water surface scene portion that includes a water surface, such as the water surface 52, via a multiple-pass process, wherein each pass involves rendering a sub-scene, and then a final scene may be rendered which includes a realistic water surface scene portion that may be generated by combining the sub-scenes in a way that realistically depicts the water surface 52. By way of non-limiting example, rendering the water surface scene portion may involve rendering a reflection sub-scene that contains imagery that would naturally be reflected off the water surface 52 given the camera view location 46 and the camera view direction 48, such as, by way of non-limiting example, imagery depicting objects 54-1-54-4 of the plurality of objects 54-1-54-7 (generally, objects 54). Rendering the water surface scene portion may also involve the rendering of a refraction sub-scene that contains imagery that would naturally be refracted by the water under the water surface 52 given the camera view location 46 and the camera view direction 48, such as, by way of non-limiting example, imagery depicting objects 54-4-54-7, and even a bathymetric surface 56 under the water surface 52, assuming that the water is transparent. What imagery may be perceivable below the water surface 52 depends in part on the clarity of the water. In some embodiments, the device 12 may allow the user 18 to designate, via a configuration file or a user interface, attributes that may affect the water surface scene portion, such as the clarity of the water, whether the sky and clouds should be rendered in the reflection sub-scene, whether the bathymetric surface 56 should be rendered in the refraction sub-scene, and the like. Greater detail may increase the realism of the simulation, but as detail increases, processing requirements of the device 12 also increase.

Figure 4:
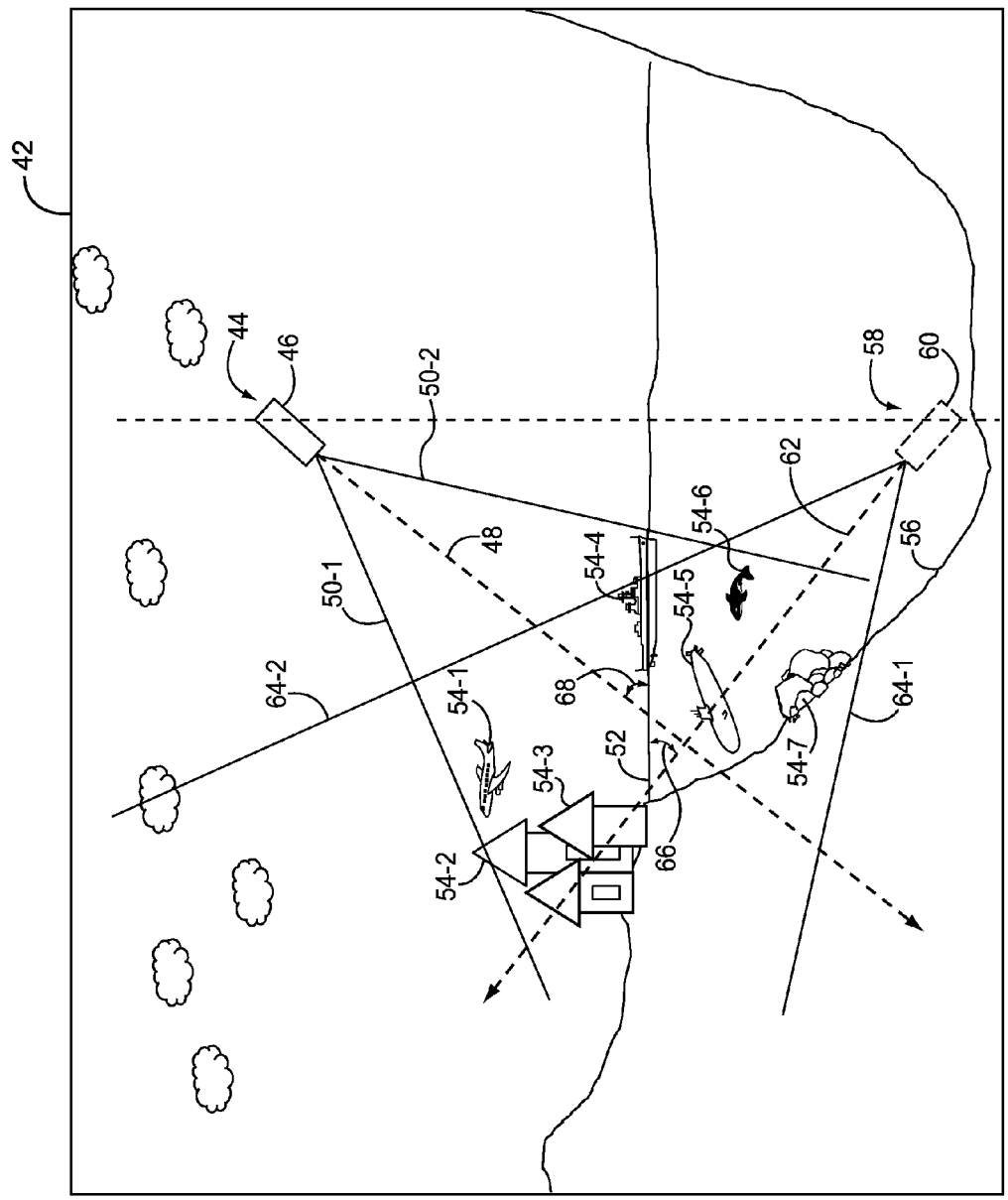
FIG. 4 is a diagram of the portion of the virtual environment illustrated in FIG. 3, and illustrates a mirrored camera view that may be used to generate a reflection sub-scene according to one embodiment.

FIG. 4 is a diagram of the portion of the virtual environment 42 illustrated in FIG. 3, and illustrates a mirrored camera view 58 that may be used to generate a reflection sub-scene according to one embodiment. The mirrored camera view 58 may be based on the camera view 44, and has a mirrored camera view location 60 and a mirrored camera view direction 62. The mirrored camera view 58 may also have an identical horizontal and vertical FOV as that of the camera view 44. The lines 64-1 and 64-2 identify that portion of the virtual environment 42 that would be perceivable from the mirrored camera view 58.

The mirrored camera view location 60 may be based on the camera view location 46, and in particular, the mirrored camera view location 60 may be at the same longitude and latitude as that of the camera view location 46, and at a distance below the water surface 52 that is equal to the distance above the water surface 52 of the camera view location 46. The mirrored camera view direction 62 may be based on the camera view direction 48, and specifically, may be reflected about the plane of the water surface 52 such that the mirrored camera view direction 62 is directed at the water surface 52 from the mirrored camera view location 60 at a same angle 66 with respect to the water surface 52 as the angle 68 of the camera view direction 48 with respect to the water surface 52. As will be discussed in greater detail herein, the mirrored camera view 58 may identify which objects 54-1-54-7 may be reflected off the water surface 52, and thus which objects 54-1-54-7 should be rendered in a reflection sub-scene.

Figure 5:
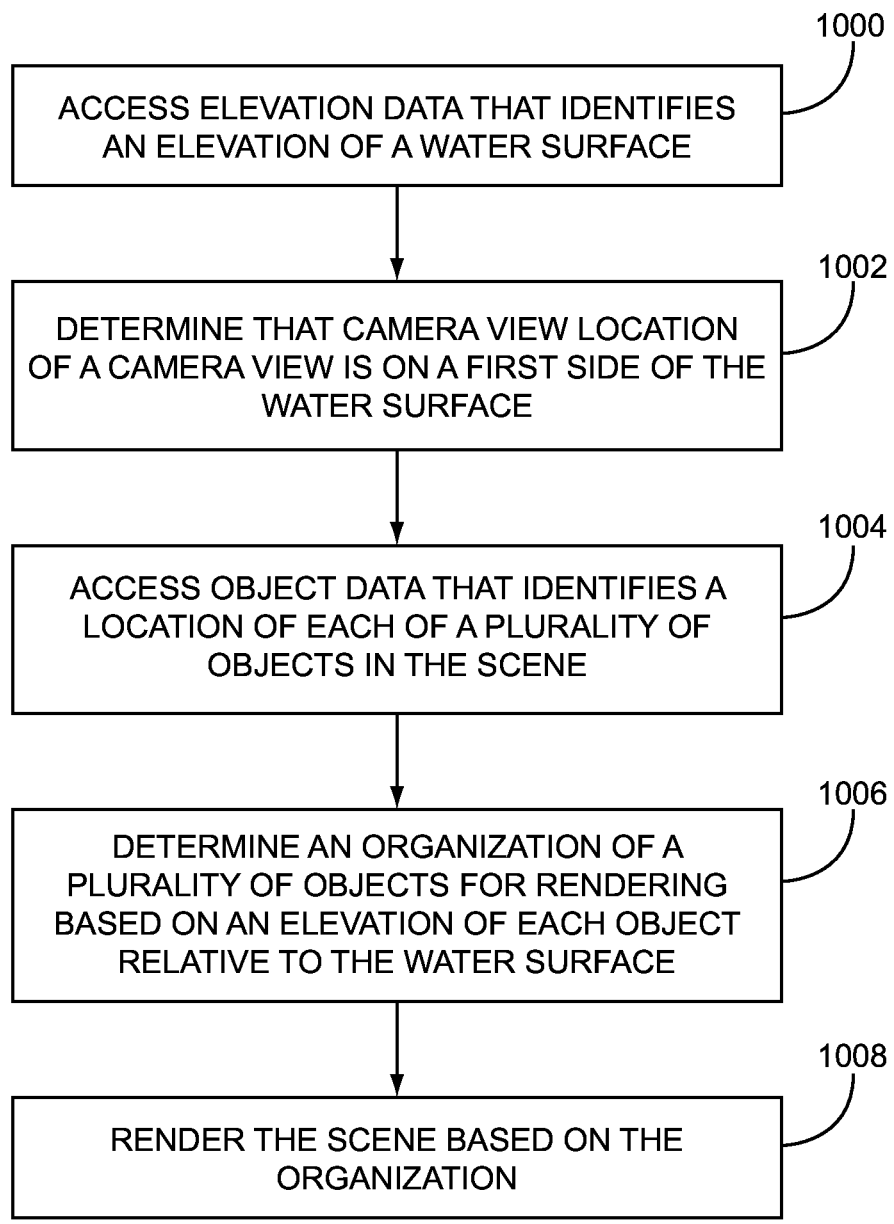
FIG. 5 is a flowchart of a method for rendering a water surface scene portion according to one embodiment.

FIG. 5 is a flowchart of a method for rendering a water surface scene portion according to one embodiment, and will be discussed in conjunction with FIGS. 1 and 4. Initially, the device 12 may access the elevation data 26 to determine the elevation of the water surface 52 at the same longitude and latitude of the camera view location 46 (FIG. 5, block 1000). Notably, as in the real world, the elevation data 26 may identify different elevations of the water surface 52 at different longitudes and latitudes. Also notably, while for purposes of illustration the embodiments are discussed from the perspective of a camera view that is above the water surface 52, the embodiments are equally applicable to camera views that are below the water surface 52, as well as camera views that bisect the water surface 52.

Based on the camera view location 46 and the elevation data 26, the device 12 determines that the camera view location 46 is on a first side of the water surface 52, specifically, on the side of the water surface that faces the sky (FIG. 5, block 1002). The device 12 may then access the object data 24 which identifies the location of each of the plurality of objects 54-1-54-7 in the virtual environment 42. As discussed previously, in one embodiment, the location of each object 54-1-54-7 may be identified by LLA values (FIG. 5, block 1004). The device 12 may then determine an organization of the plurality of objects 54-1-54-7 for rendering based on the elevation of each object 54-1-54-7 relative to the water surface 52 (FIG. 5, block 1006). As discussed above, the elevation of the water surface 52 may be different at the longitude and latitude of each object 54-1-54-7. The device 12 may then render the water surface scene portion based on the organization (FIG. 5, block 1008). Prior to rendering the water surface scene portion, object location information associated with the objects 54-1-54-7 that will be depicted in the water surface scene portion may be converted from 64-bit LLA location information to 32-bit x,y,z local coordinate information.

As discussed previously, the water surface scene portion may be rendered by combining a plurality of rendered sub-scenes. In such embodiment, organizing the plurality of objects 54-1-54-7 for rendering may include determining, for each object of the plurality of objects 54-1-54-7, at least one sub-scene in which the object is to be rendered. By way of non-limiting example, if an object 54-1-54-7 is on a same side of the water surface 52 as the camera view 44 and would be seen as a reflection off the water surface 52, the object 54-1-54-7 may be organized for rendering such that the object 54-1-54-7 is rendered in a reflection sub-scene. If the object 54-1-54-7 is on an opposite side of the water surface 52 as the camera view 44 and would be seen through the water surface 52, the object 54-1-54-7 may be organized for rendering such that the object 54-1-54-7 is rendered in a refraction sub-scene. Based on water clarity and/or other attribute data, the object 54-1-54-7 may be organized such that it is not rendered in any sub-scene. In some embodiments, each sub-scene may comprise a texture in a memory, such as a graphics memory.

Figure 6:
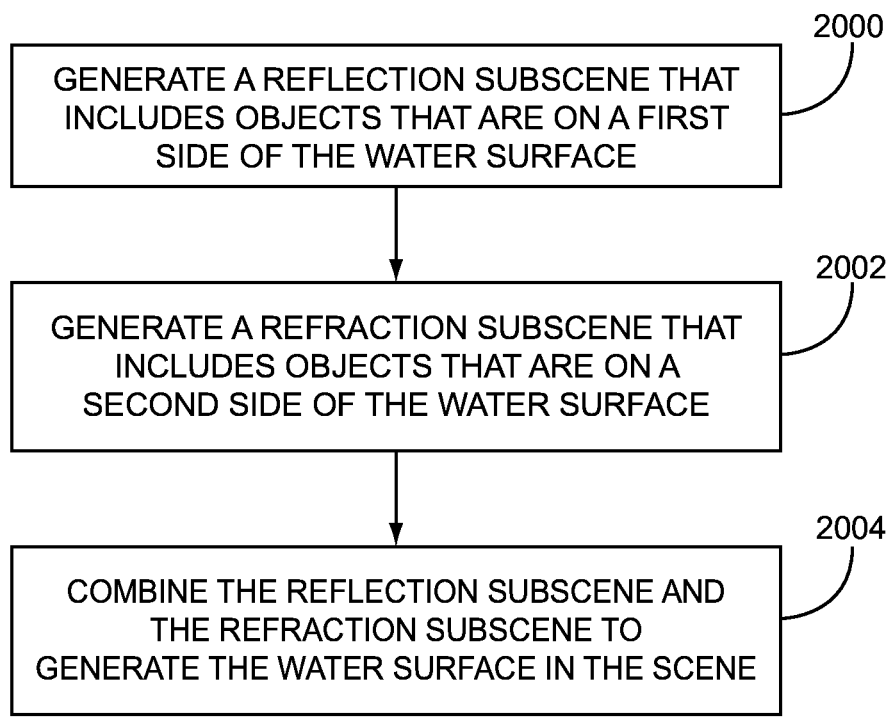
FIG. 6 is a flowchart of a method for generating a water surface scene portion based on multiple sub-scenes according to one embodiment.

FIG. 6 is a flowchart of a method for generating a water surface scene portion based on multiple sub-scenes according to one embodiment. The device 12 may generate a reflection sub-scene that includes those objects 54-1-54-7 that are on the first side of the water surface 52, and that would reflect off the water surface 52 into the camera view 44 (FIG. 6, block 2000). The device 12 may also generate a refraction sub-scene that includes those objects 54-1-54-7 that are on the opposite, second, side of the water surface 52 from the camera view 44, and that may be perceivable through the water surface 52 from the camera view 44 given the clarity of the water, and the like (FIG. 6, block 2002). The device 12 may then combine the reflection sub-scene with the refraction sub-scene to generate a water surface scene portion that realistically depicts the water surface 52 (FIG. 6, block 2004). The device 12 may then generate a final scene that includes the water surface scene portion, as well as other objects and features that are on the same side of the water surface 52 as the camera view 44, such as terrain, boats, clouds, and the like.

Figure 7:
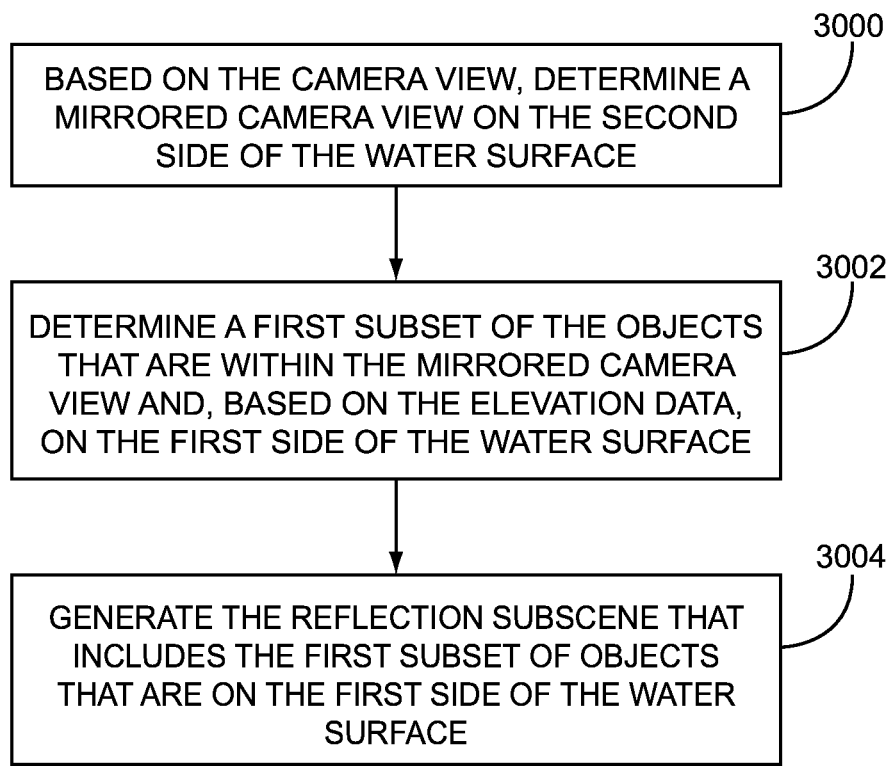
FIG. 7 is a flowchart of a method for generating a reflection sub-scene according to one embodiment.

FIG. 7 is a flowchart of a method for generating a reflection sub-scene according to one embodiment, and will be discussed in conjunction with FIG. 4. The device 12, based on the camera view 44, determines the mirrored camera view 58 (FIG. 7, block 3000). The mirrored camera view 58, as discussed with regard to FIG. 4, has a mirrored camera view location 60, a mirrored camera view direction 62, and a horizontal and vertical FOV such that objects 54-1-54-7 that are on the same side of the water surface 52 as that of the camera view 44 and that are within the mirrored camera view 58, as illustrated by the lines 64-1 and 64-2, may be reflected by the water surface 52 into the camera view 44. The device 12 determines a first subset of the objects 54-1-54-7 that are within the mirrored camera view 58, and based on the elevation data 26, on the first side of the water surface 52 (FIG. 7, block 3002). In this example, the first subset of objects 54-1-54-7 may include the objects 54-1-54-4, each of which is an object within the mirrored camera view 58, and on the same side of the water surface 52 as the camera view 44.

Note that some objects, such as the object 54-4, may intersect the water surface 52 such that a portion of the object 54-4 is above the water surface 52 and a portion of the object 54-4 is below the water surface 52. In one embodiment, the object data 24 may include data that identifies a boundary, such as a radius, for each object 54. The device 12 may then use the radius of the object 54 in conjunction with the LLA location information of the object 54 relative to the elevation of the water surface 52 at the same longitude and latitude to determine if all of the object 54 is on one side of the water surface 52, or only a portion of an object 54 is on one side of the water surface 52. Thus, an object 54 may be included in multiple sub-scenes.

The device 12 may then generate the reflection sub-scene and include the first subset of objects 54-1-54-4 in the reflection sub-scene, and exclude the objects 54-5-54-7 from the reflection sub-scene (FIG. 7, block 3004).

As discussed above, the methods discussed herein, while shown for purposes of illustration from the context of a camera view above the water surface 52, are equally applicable to a camera view below the water surface 52. When a camera view is below the water surface 52, it may also be desirable to simulate the murkiness or fog-like appearance of viewing items through water.

Figure 8:
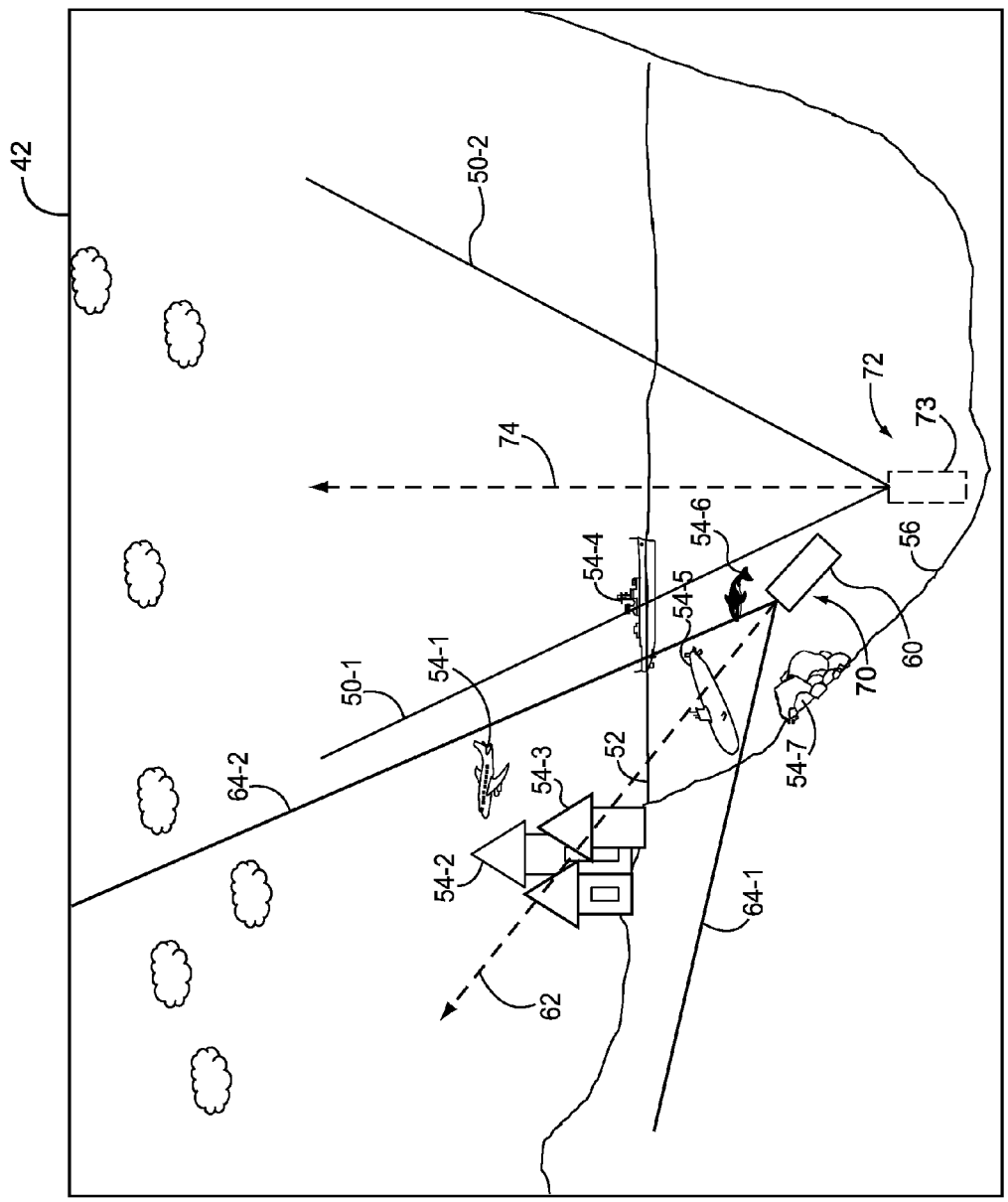
FIG. 8 is a diagram of the virtual environment illustrated in FIGS. 3 and 4.

FIG. 8 is a diagram of the portion of the virtual environment 42 illustrated in FIGS. 3 and 4.

Figure 9:
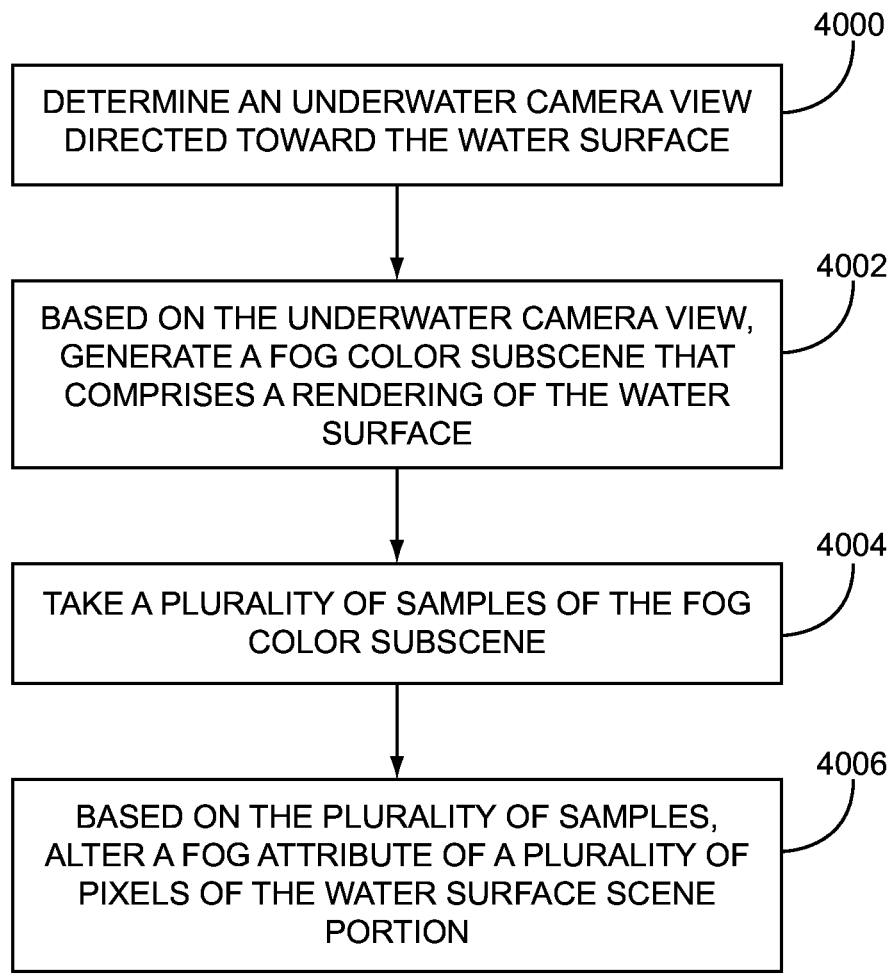
FIG. 9 is a flowchart of a method for generating a fog color sub-scene that may be used to realistically simulate low visibility from a view below the water surface according to one embodiment.

FIG. 9 is a flowchart of a method for generating a fog color sub-scene that may be used to realistically simulate low visibility from a view below the water surface 52 according to one embodiment. Assume for purposes of discussing FIGS. 8 and 9 that the user 18 perceives the virtual environment 42 from the perspective of an underwater camera view 70, which may be associated with, by way of non-limiting example, a simulated scuba diver (not illustrated) in the virtual environment 42. The device 12 may determine an underwater upward directing camera view 72 which may be directed toward the water surface 52 from a location 73 below the water surface 52 (FIG. 9, block 4000). Preferably, the upward directing camera view 72 has a camera view direction 74 which is perpendicular to the water surface 52. Based on the upward directing camera view 72, the device 12 generates a fog color sub-scene that comprises a rendering of the water surface 52 (FIG. 9, block 4002). In one embodiment, the fog color sub-scene may be a low-resolution rendering of the water surface 52. During the generation of the final water surface scene portion, the device 12 may take a plurality of samples of the fog color sub-scene, and based on the samples, alter a fog attribute of a plurality of pixels of the water surface scene portion (FIG. 9, blocks 4004-4006). The use of the fog color sub-scene to alter a fog attribute of the water surface scene portion ensures an underwater "fog color" that matches the color of the water in which the camera view 70 is located. The fog color sub-scene may also be used in the rendering of the final scene by blending in the fog color from the fog sub-scene based on each respective pixel's distance from the camera view location. Thus, an object such as, by way of non-limiting example, a submarine, may appear murky when seen from underwater.

Referring again to FIG. 3, the embodiments have been discussed primarily with respect to generating the water surface scene portion of a scene of the virtual environment 42. Depending on the particular camera view, such as the camera view 44, the scene displayed to the user 18 may include the water scene portion as well as other portions, such as a terrain portion, or a bathymetric portion. The embodiments are not limited to any particular method of assembling the scene portions of a scene, and indeed, are applicable where the entire scene is the water surface scene portion. However, in one embodiment, a scene including scene portions other than a water surface scene portion may be built in the following manner. Assume a camera view location above the water surface 52, such as the camera view 44. The device 12 may initially do a reflection pass, wherein a mirrored camera view is determined, as discussed with regard to FIGS. 4, 6, and 7. During the reflection pass, the device 12 may, based on the elevations of objects 54-1-54-4 with respect to the elevation of the water surface 52, determine an organization of the objects 54-1-54-4 that excludes objects that are located on the other side of the water surface 52 (in this example, excluding objects 54 below the water surface 52).

The device 12 may also exclude objects 54 based on configurable settings, such as reflection detail settings, which may, for example, allow a user to indicate whether the sky, including the clouds, should be depicted as a reflection on the water surface 52 or not. The device 12 may also take into account a radius associated with each object 54 to determine whether a portion of the object 54 is on the same side of the water surface 52 as the camera view or not. The device 12 may then render those objects 54 that have not been excluded. The device 12 may also render any terrain surface that is within the camera view 44. When rendering from the perspective of an underwater camera view, the device 12 may render a bathymetric surface. In some embodiments, the elevation data 26 may comprise a multi-layer DEM, and thus the elevation values associated with the terrain surface of the virtual environment 42, the bathymetric surface of the virtual environment 42 and the water surface 52 of the virtual environment 42 may all be stored in the elevation data 26, facilitating rapid determination of elevations of multiple surfaces within the virtual environment 42, as well as the elevations of various objects 54 with respect to such surfaces. By way of non-limiting example, the device 12 can rapidly determine that the elevation of a particular object may be greater than a bathymetric surface elevation at the longitude and latitude of the particular object, but less than a water surface elevation at that same longitude and latitude, and thus is underwater. In some embodiments, it may be desirable to generate multiple meshes concurrently using the techniques disclosed in "CONCURRENT MESH GENERATION IN A COMPUTER SIMULATION," referenced above.

The device 12 may then perform a refraction pass. The device 12 may determine an organization of the objects 54-1-54-7 wherein those objects 54 on the same side of the water surface 52 as the camera view are excluded for rendering. If the camera view is above the water surface 52, the device 12 may also render the bathymetric surface that is within the camera view. If the camera view is below the water surface 52, the device 12 may instead render the terrain surface that is within the camera view.

If the camera view is under the water surface 52, the device 12 may then perform an underwater fog pass using, for example, the techniques discussed above with regard to FIGS. 8 and 9.

The device 12 may then perform a final pass render to generate a final scene based on the sub-scene output of the reflection pass, the refraction pass, and the fog color pass, and which may then be presented or otherwise displayed to the user 18. In one embodiment, the device 12 may perform the final pass render by rendering those objects that are on the same side of the water surface 52, and excluding those objects that are determined to be on the other side of the water surface 52. An object radius may be taken into account in determining on which side of the water surface 52 an object is located. If the scene is an underwater scene, the fog color may be read into each shader module to simulate low visibility underwater. If the camera view location is above the water surface 52, a terrain mesh may also be rendered. If the camera view location is below the water surface 52 a bathymetric mesh may be rendered. The output of the reflection and refraction passes discussed above may then be used for the water surface scene portions of the final scene. In one embodiment, this may be done by using standard techniques to determine the water surface's base color at each pixel, and then blending that color with colors read into the shader module from the sub-scene outputs of the reflection pass, the refraction pass, and the fog color pass.

In one embodiment, the camera view may bisect the water surface 52, such as might occur during the extension of a periscope of a submarine above the water surface 52 from an initial position below the water surface 52. As the camera view bisects the water surface 52, all scene objects within the camera view may be rendered because the camera view encompasses both sides of the water surface 52 concurrently. As the camera view moves below the water surface 52, the final scene may fade from the above water scene to the below water scene. The fade may be based on a distance below the water surface 52 so that the visual transition from above the water surface 52 to below the water surface 52 is relatively smooth.

Figure 10:
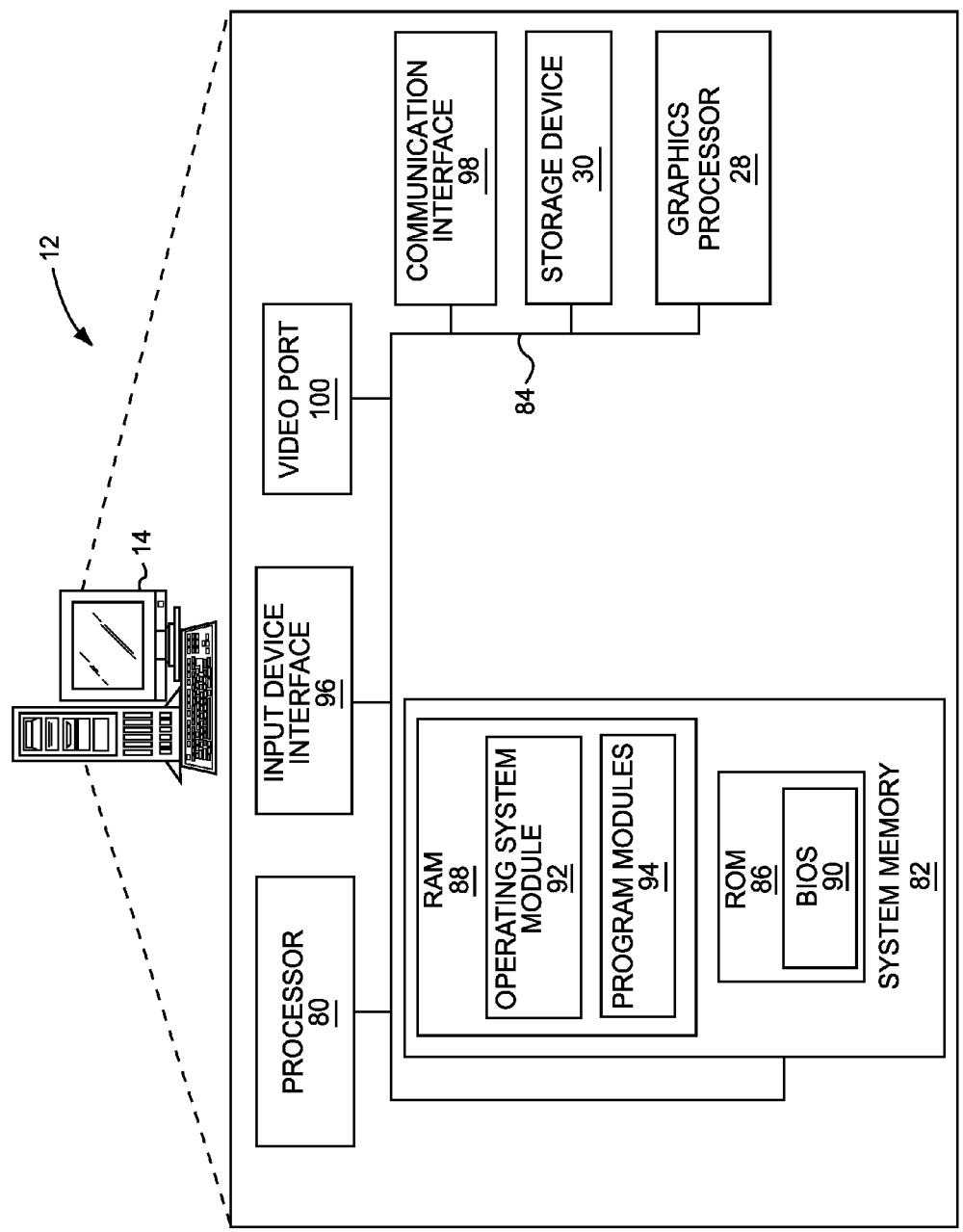
FIG. 10 is a block diagram of a device according to one embodiment.

FIG. 10 is a block diagram of a device 12 according to one embodiment. The device 12 may comprise any computing or processing device capable of executing software instructions to implement the functionality described herein, such as, by way of non-limiting example, a work station, a desktop or laptop computer, a tablet computer, or the like. The device 12 includes a processor 80, a system memory 82, and a system bus 84. The system bus 84 provides an interface for system components including, but not limited to, the system memory 82 and the processor 80. The processor 80 may be any commercially available or proprietary processor. Dual microprocessors and other multi-processor architectures may also be employed as the processor 80.

The system bus 84 may be any of several types of bus structures that may further interconnect to a memory bus (with or without a memory controller), a peripheral bus, and/or a local bus using any of a variety of commercially available bus architectures. The system memory 82 may include non-volatile memory 86 (e.g., read only memory (ROM), erasable programmable read only memory (EPROM), electrically erasable programmable read only memory (EEPROM), etc.) and/or volatile memory 88 (e.g., random access memory (RAM)). A basic input/output system (BIOS) 90 may be stored in the non-volatile memory 86, and can include the basic routines that help to transfer information between elements within the device 12. The volatile memory 88 may also include a high-speed RAM, such as static RAM, for caching data.

The device 12 may further include the computer-readable storage device 30, which may comprise, by way of non-limiting example, an internal hard disk drive (HDD) (for example, an enhanced integrated drive electronics (EIDE) HDD or serial advanced technology attachment (SATA) HDD), a flash memory, or the like. The computer-readable storage device 30 and other drives, sometimes referred to as computer-readable or computer-usable media, provide non-volatile storage of data, data structures, computer-executable instructions, and the like. Although for purposes of illustration the description of the computer-readable storage device 30 above refers to a HDD, it should be appreciated by those skilled in the art that other types of media which are readable by a computer, such as Zip disks, magnetic cassettes, flash memory cards, cartridges, and the like, may also be used in the operating environment, and further, that any such media may contain computer-executable instructions for performing novel functionality as disclosed herein.

A number of modules can be stored in the computer-readable storage device 30 and in the volatile memory 88, including an operating system module 92 and one or more program modules 94, which may implement the functionality described herein in whole or in part. It is to be appreciated that the embodiments can be implemented with various commercially available operating system modules 92 or combinations of operating system modules 92.

All or a portion of the embodiments may be implemented as a computer program product stored on a non-transitory computer-usable or computer-readable storage medium, such as the computer-readable storage device 30, which may include complex programming instructions, such as complex computer-readable program code, configured to cause the processor 80 to carry out the functionality described herein. Thus, the computer-readable program code can comprise software instructions for implementing the functionality of the embodiments described herein when executed on the processor 80. The processor 80, in conjunction with the program modules 94 in the volatile memory 88, may serve as a control system for the device 12 that is configured to, or adapted to, implement the functionality described herein.

A user may be able to enter commands and information into the device 12 through one or more input devices, such as, by way of non-limiting example, a keyboard (not illustrated), a pointing device such as a mouse (not illustrated), a touch-sensitive surface (not illustrated), or the like. Other input devices may include a microphone, an infrared (IR) remote control, a joystick, a game pad, a stylus pen, or the like. These and other input devices may be connected to the processor 80 through an input device interface 96 that is coupled to the system bus 84, but can be connected by other interfaces such as a parallel port, an Institute of Electrical and Electronic Engineers (IEEE) 1394 serial port, a Universal Serial Bus (USB) port, an IR interface, and the like.

The device 12 may also include a communication interface 98 suitable for communicating with the network 22. The device 12 may also include a video port 100 that drives the display device 14. The video port 100 may receive imagery, such as water surface imagery, from the graphics processor 28.

The display device 14 may be separate from the device 12, or may be integrated with the device. Non-limiting examples of the display device 12 include an LCD or plasma monitor, a projector, or a head-mounted display.

Those skilled in the art will recognize improvements and modifications to the embodiments disclosed herein. All such improvements and modifications are considered within the scope of the concepts disclosed herein and the claims that follow.

What is claimed is:

1. A method, comprising:
accessing elevation data that identifies an elevation of a water surface in a virtual environment;
based on the elevation data, determining that a camera view location of a camera view is on a first side of the water surface;
accessing object data that identifies a location comprising an elevation of each object of a plurality of objects in a scene;
determining an organization of a plurality of objects for rendering based on the elevation of each object of the plurality of objects relative to the water surface; and
rendering a water surface scene portion of the scene based on the organization.

2. The method of claim 1, wherein determining the organization of the plurality of objects for rendering comprises determining, for each object of the plurality of objects, at least one sub-scene in which the each object is to be rendered.

3. The method of claim 1, wherein rendering the water surface scene portion comprises:
generating a reflection sub-scene that includes objects of the plurality of objects that are on the first side of the water surface;
generating a refraction sub-scene that includes objects of the plurality of objects that are on a second side of the water surface; and
combining the reflection sub-scene and the refraction sub-scene to generate the water surface scene portion.

4. The method of claim 3, wherein generating the reflection sub-scene that includes those objects of the plurality of objects that are on the first side of the water surface comprises:
based on the camera view, determining a mirrored camera view on the second side of the water surface, the mirrored camera view including a mirrored camera view location and a mirrored camera view direction;
determining a first subset of the plurality of objects that are within the mirrored camera view and, based on the elevation data, on the first side of the water surface; and
generating the reflection sub-scene that includes the first subset of objects of the plurality of objects that are on the first side of the water surface.

5. The method of claim 4, wherein generating the refraction sub-scene that includes those objects of the plurality of objects that are on the second side of the water surface comprises:
determining a second subset of the plurality of objects that are within the camera view and, based on the elevation data, on the second side of the water surface; and
generating the refraction sub-scene that includes the second subset of objects of the plurality of objects that are on the second side of the water surface.

6. The method of claim 5, wherein determining the second subset of the plurality of objects comprises determining that at least a second portion of the at least one object is on the second side of the water surface, and based on the determination, determining that the at least one object is in the second subset of the plurality of objects.

7. The method of claim 5, wherein:
the object data comprises a corresponding longitude, latitude, and elevation for each object of the plurality of objects, and wherein the elevation data comprises a longitude, latitude, and elevation at each location of a plurality of locations of the water surface;
wherein determining the organization for the plurality of objects for rendering further comprises:
determining, for each object, the corresponding longitude, latitude, and elevation of the each object, accessing the elevation data, determining an elevation of the water surface at the longitude and latitude, and processing the each object for rendering based on a difference between the elevation of the each object and the elevation of the water surface at the longitude and latitude; and
further comprising:
translating the location of each object of the plurality of objects from the corresponding longitude, latitude, and elevation to an x, y, and z coordinate of a local coordinate system prior to rendering the water surface scene portion.

8. The method of claim 7, wherein the object data comprises 64-bit longitude, latitude, and elevation values for each object of the plurality of objects, and wherein translating the location of each object of the plurality of objects further comprises:
translating the location of each object of the plurality of objects from the corresponding 64-bit longitude, latitude, and elevation values to 32-bit x, y, and z coordinates of the local coordinate system prior to rendering the scene.

9. The method of claim 5, wherein the first side of the water surface is above the water surface and the second side of the water surface is below the water surface, and further comprising:
determining an underwater camera view having a camera view location below the water surface and a camera view direction that is directed toward the water surface;
based on the underwater camera view, generating a fog color sub-scene that comprises a rendering of the water surface; and
wherein combining the reflection sub-scene and the refraction sub-scene to generate the water surface scene portion further comprises:
taking a plurality of samples of the fog color sub-scene; and
based on the plurality of samples, altering a fog attribute of a plurality of pixels of the water surface scene portion.

10. The method of claim 1, wherein the object data comprises a corresponding longitude, latitude, and elevation of each object of the plurality of objects, and wherein the elevation data comprises a longitude, latitude, and elevation at each location of a plurality of locations of the water surface.

11. The method of claim 10, further comprising:
wherein determining the organization of the plurality of objects for rendering comprises:
determining, for each object, the corresponding longitude, latitude, and elevation of the each object, accessing the elevation data, determining an elevation of the water surface at the longitude and latitude, and determining into which sub-scene of a plurality of sub-scenes the each object is to be rendered based on a difference between the elevation of the object and the elevation of the water surface at the longitude and latitude.

12. The method of claim 11, wherein the elevation of the water surface at one location of the plurality of locations differs from the elevation of the water surface at another location of the plurality of locations.

13. The method of claim 1, wherein the elevation data comprises a multi-layer digital elevation model (DEM) that identifies a first elevation layer at locations in the virtual environment and a second elevation layer at the locations in the virtual environment, and wherein the first elevation layer comprises the elevation of the water surface, and the second elevation layer comprises an elevation of a bathymetric surface under the water surface.

14. A device, comprising:
a communication interface configured to be coupled to a network; and
a processor coupled to the communication interface and configured to:
access elevation data that identifies an elevation of a water surface in a virtual environment;
based on the elevation data, determine that a camera view location of a camera view is on a first side of the water surface;
access object data that identifies a location comprising an elevation of each object of a plurality of objects in a scene;
determine an organization of a plurality of objects for rendering based on the elevation of each object of the plurality of objects relative to the water surface; and
render a water surface scene portion of the scene based on the organization.

15. The device claim 14, wherein to determine the organization of the plurality of objects for rendering the processor is further configured to determine, for each object of the plurality of objects, at least one sub-scene in which the each object is to be rendered.

16. The device of claim 14, wherein to render the water surface scene portion the processor is further configured to:
  generate a reflection sub-scene that includes objects of the plurality of objects that are on the first side of the water surface;
  generate a refraction sub-scene that includes objects of the plurality of objects that are on a second side of the water surface; and
  combine the reflection sub-scene and the refraction sub-scene to generate the water surface scene portion.

17. The device of claim 16, wherein to generate the reflection sub-scene the processor is further configured to:
  based on the camera view, determine a mirrored camera view on the second side of the water surface, the mirrored camera view including a mirrored camera view location and a mirrored camera view direction;
  determine a first subset of the plurality of objects that are within the mirrored camera view and, based on the elevation data, on the first side of the water surface; and
  generate the reflection sub-scene that includes the first subset of objects of the plurality of objects that are on the first side of the water surface.

18. The device of claim 14, wherein:
  the object data comprises a corresponding longitude, latitude, and elevation for each object of the plurality of objects, and wherein the elevation data comprises a longitude, latitude, and elevation at each location of a plurality of locations of the water surface;
  wherein to process each object for rendering based on the elevation of the each object relative to the water surface the processor is further configured to:
    determine, for each object, the corresponding longitude, latitude, and elevation of the each object, access the elevation data, determine an elevation of the water surface at the longitude and latitude, and process the each object for rendering based on a difference between the elevation of the each object and the elevation of the water surface at the longitude and latitude; and
    translate the location of each object of the plurality of objects from the corresponding longitude, latitude, and elevation to an x, y and z coordinate of a local coordinate system prior to rendering the water surface scene portion.

19. The device of claim 18, wherein the object data comprises 64-bit longitude, latitude, and elevation values for each object of the plurality of objects, and wherein to translate the location of each object of the plurality of objects the processor is further configured to:
  translate the location of the each object of the plurality of objects from the corresponding 64-bit longitude, latitude, and elevation values to 32-bit x, y and z coordinates of the local coordinate system prior to rendering the scene.

20. A method for generating a water surface scene portion, comprising:
  accessing elevation data that identifies an elevation of a water surface in a virtual environment;
  determining, based on the elevation data, a camera view location below the water surface that provides an underwater camera view;
  determining that the underwater camera view is directed toward the water surface;
  generating, based on the underwater camera view, a fog color sub-scene;
  generating a reflection sub-scene that includes a first plurality of objects that, based on the elevation data, are located below the water surface;
  generating a refraction sub-scene that includes a second plurality of objects that, based on the elevation data, are located above the water surface; and
  generating, based on the reflection sub-scene, the refraction sub-scene, and the fog color sub-scene, a water surface scene portion, comprising:
    taking a plurality of samples of the fog color sub-scene; and
    based on the plurality of samples, altering a fog attribute of a plurality of pixels of the reflection sub-scene and the refraction sub-scene.

* * * * *